United States Patent
Ikeda et al.

(10) Patent No.: US 11,073,823 B2
(45) Date of Patent: Jul. 27, 2021

(54) ROBOT AND ROBOT MAINTENANCE TIMING NOTIFICATION METHOD

(71) Applicant: FANUC CORPORATION, Yamanashi (JP)

(72) Inventors: Yu Ikeda, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 7 days.

(21) Appl. No.: 16/244,320

(22) Filed: Jan. 10, 2019

(65) Prior Publication Data
US 2019/0235479 A1    Aug. 1, 2019

(30) Foreign Application Priority Data
Jan. 31, 2018  (JP) .............................. JP2018-014896

(51) Int. Cl.
*G05B 19/418* (2006.01)

(52) U.S. Cl.
CPC ... *G05B 19/41865* (2013.01); *G05B 19/4184* (2013.01); *G05B 19/41815* (2013.01)

(58) Field of Classification Search
CPC . B25J 9/1682; B25J 9/1692; G05B 19/41815; G05B 19/4184; G05B 19/41865; G05B 2219/39156; G05B 2219/39167; G05B 23/0283; G05B 19/41875; G06N 20/00
USPC ................ 700/175, 245, 254; 702/183–184, 702/188–189; 714/25–26
See application file for complete search history.

(56) References Cited

U.S. PATENT DOCUMENTS

| | | | | |
|---|---|---|---|---|
| 5,353,238 A | * | 10/1994 | Neef | G05B 19/4063 |
| | | | | 702/184 |
| 5,571,957 A | * | 11/1996 | Tanaka | G05B 19/4065 |
| | | | | 73/104 |
| 6,804,580 B1 | * | 10/2004 | Stoddard | B25J 9/1682 |
| | | | | 700/248 |
| 2001/0047504 A1 | * | 11/2001 | Aoyama | G05B 23/0229 |
| | | | | 714/799 |

(Continued)

FOREIGN PATENT DOCUMENTS

| | | |
|---|---|---|
| CN | 101256404 A | 9/2008 |
| CN | 104035394 A | 9/2014 |

(Continued)

OTHER PUBLICATIONS

Fanuc Corporation, "Notice Function of Maintenance Time", Manual of robot/system, B-83284JA—Feb. 2006; 33 pages.

(Continued)

*Primary Examiner* — Jeffrey P Aiello
(74) *Attorney, Agent, or Firm* — Maier & Maier, PLLC

(57) ABSTRACT

A robot including a movable portion, a controller, and a storage unit that stores maintenance timing information regarding at least one of the movable portion and the controller. The controller performs predetermined notification processing based on a comparison between elapsed time information and the maintenance timing information. The movable portion and the control apparatus are placed in a predetermined work site on which a second robot is installed. The controller corrects the maintenance timing information or the elapsed time information using information received from the second robot.

8 Claims, 3 Drawing Sheets

(56) References Cited

U.S. PATENT DOCUMENTS

| | | | |
|---|---|---|---|
| 2002/0065749 A1 | 5/2002 | Ikeda et al. | |
| 2004/0138967 A1 | 7/2004 | Ikeda et al. | |
| 2005/0102052 A1* | 5/2005 | Yoshida | H05K 13/0882 700/117 |
| 2006/0091842 A1* | 5/2006 | Nishiyama | G05B 19/4183 318/568.11 |
| 2006/0224255 A1* | 10/2006 | Tanaka | G05B 13/042 700/42 |
| 2007/0067678 A1* | 3/2007 | Hosek | G05B 23/0235 714/25 |
| 2007/0093939 A1 | 4/2007 | Kobayashi et al. | |
| 2007/0100233 A1* | 5/2007 | Thomson | A61N 5/1049 600/427 |
| 2008/0147226 A1* | 6/2008 | Matsushita | G05B 19/41875 700/110 |
| 2008/0147232 A1* | 6/2008 | Kuribayashi | H05K 13/0895 700/160 |
| 2008/0228314 A1 | 9/2008 | Sjostrand et al. | |
| 2009/0015404 A1* | 1/2009 | Lin | B25J 9/1674 340/540 |
| 2009/0128350 A1* | 5/2009 | Okuyama | D05B 19/02 340/679 |
| 2013/0325244 A1* | 12/2013 | Wang | G06T 11/00 701/26 |
| 2014/0257530 A1 | 9/2014 | Misoka | |
| 2014/0358279 A1* | 12/2014 | Kimoto | G05B 23/0289 700/245 |
| 2016/0149996 A1 | 5/2016 | Eckert et al. | |
| 2016/0207200 A1 | 7/2016 | Kuffner, Jr. et al. | |
| 2016/0246274 A1 | 8/2016 | Ikeda et al. | |
| 2016/0271792 A1* | 9/2016 | Yui | G06F 3/0488 |
| 2016/0288328 A1* | 10/2016 | Bingham | G06Q 10/20 |
| 2017/0028553 A1 | 2/2017 | Tsuda et al. | |
| 2017/0031329 A1 | 2/2017 | Inagaki et al. | |
| 2017/0220032 A1 | 8/2017 | Ooba | |
| 2017/0243466 A1 | 8/2017 | Krishnaswami et al. | |
| 2017/0248941 A1 | 8/2017 | Arita | |
| 2017/0293289 A1 | 10/2017 | Kobayashi | |
| 2017/0305369 A1* | 10/2017 | Ono | B60R 16/0234 |
| 2018/0243916 A1 | 8/2018 | Hashimoto et al. | |
| 2019/0201137 A1* | 7/2019 | Shelton, IV | H04N 5/272 |
| 2019/0224844 A1 | 7/2019 | Tsuda et al. | |
| 2019/0265657 A1 | 8/2019 | Inagaki et al. | |

FOREIGN PATENT DOCUMENTS

| | | |
|---|---|---|
| CN | 105631577 A | 6/2016 |
| CN | 107430708 A | 12/2017 |
| EP | 1 178 417 A2 | 2/2002 |
| EP | 1752848 A1 | 2/2007 |
| EP | 1 965 281 A1 | 9/2008 |
| EP | 3 342 553 A1 | 7/2018 |
| JP | S58-223594 A | 12/1983 |
| JP | H10-228310 A | 8/1998 |
| JP | 2002-041131 A | 2/2002 |
| JP | 2004-202624 A | 7/2004 |
| JP | 2004-306200 A | 11/2004 |
| JP | 2006-127047 A | 5/2006 |
| JP | 2007-021685 A | 2/2007 |
| JP | 2007-206007 A | 8/2007 |
| JP | 2009-018409 A | 1/2009 |
| JP | 2016-157343 A | 9/2016 |
| JP | 2017-030137 A | 2/2017 |
| JP | 2017-120618 A | 7/2017 |
| JP | 2017-120649 A | 7/2017 |
| JP | 2017-134661 A | 8/2017 |
| JP | 2017-151869 A | 8/2017 |
| JP | 2017-188038 A | 10/2017 |
| JP | 2018008316 A | 1/2018 |
| WO | 2016/160279 A1 | 10/2016 |
| WO | 2017/033358 A1 | 3/2017 |

OTHER PUBLICATIONS

Japanese Decision to Grant a Patent dated Jan. 14, 2020, in connection with corresponding JP Application No. 2018-014896 (6 pgs., including machine-generated English translation).

Japanese Search Report dated Dec. 9, 2019, in connection with corresponding JP Application No. 2018-014896 (22 pgs., including machine-generated English translation).

Chinese Office Action dated Apr. 24 2020, in connection with corresponding CN Application No. 201910086472.6 (18 pgs., including machine-generated English translation).

* cited by examiner

ROBOT AND ROBOT MAINTENANCE TIMING NOTIFICATION METHOD

CROSS-REFERENCE TO RELATED APPLICATIONS

This application is based on and claims priority to Japanese Patent Application No. 2018-014896 filed on Jan. 31, 2018, the entire content of which is incorporated herein by reference.

FIELD

The present invention relates to a robot and a robot maintenance timing notification method.

BACKGROUND

A robot has been known that has an accumulation function of accumulating the actual working time and a notification function of giving notification when the accumulated actual working time reaches a threshold (refer, for example, to Japanese Unexamined Patent Application, Publication No. S58-223594).

A production system is also known that manages multiple manufacturing machines divided into multiple groups (refer, for example, to Japanese Unexamined Patent Application, Publication No. 2017-151869). The production system analyzes an unusuality that has occurred in each group. The production system also indicates any group with a high frequency of unusualities on a display device based on the analysis results.

SUMMARY

A robot according to a first aspect of the present invention includes a movable portion; a controller; and a storage unit that stores maintenance timing information regarding at least one of the movable portion and the controller, wherein the controller performs predetermined notification processing based on a comparison between elapsed time information and the maintenance timing information, the movable portion and the controller are placed in a predetermined work site on which a second robot is installed, and the controller corrects the maintenance timing information or the elapsed time information using information received from the second robot.

A second aspect of the present invention is a maintenance timing notification method for a robot installed in a predetermined work site, the robot including a movable portion, a controller, and a storage unit that stores maintenance timing information regarding at least one of the movable portion and the controller, the method comprising: comparison, by the controller, of elapsed time information and the maintenance timing information; performing, by the controller, predetermined notification based on a comparison result from the comparison; and before the comparison, correcting, by the controller, the maintenance timing information or the elapsed time information using information received from a second robot installed in the predetermined work site.

DETAILED DESCRIPTION

A working system including a plurality of robots 1 according to an embodiment of the present invention will now be described with reference to the drawings.

Figure 1:
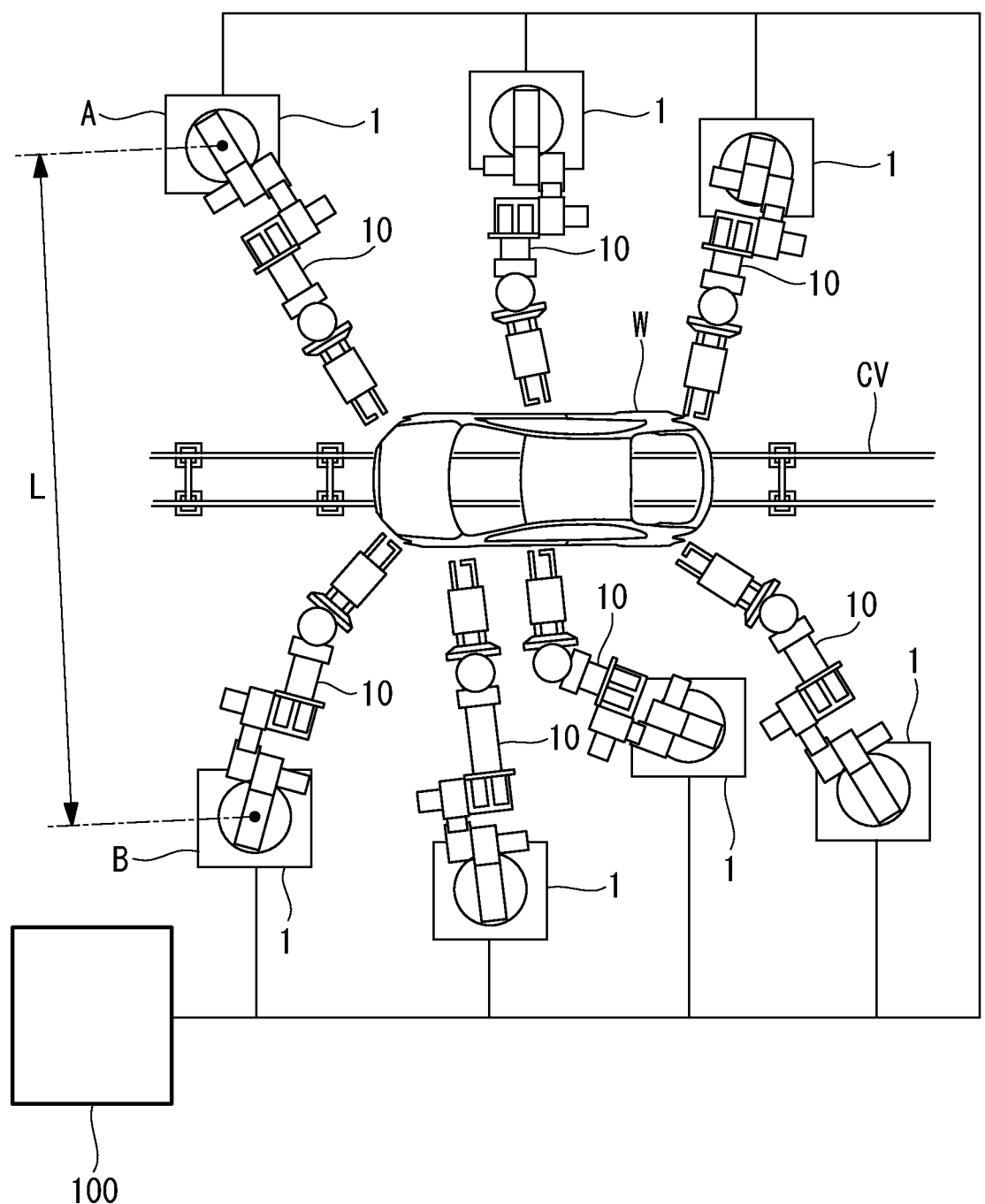
FIG. 1 is a schematic top view of a working system according to an embodiment of the present invention.

The working system of the present embodiment, as illustrated in FIG. 1, performs predetermined work on a workpiece W with the multiple robots 1. The working system performs work such as welding on a workpiece W, picking of a workpiece W, and coating of a workpiece W with the robots 1. In another example, the different robots 1 may perform different kinds of work on the same workpiece W. In the present embodiment, a workpiece W is transported to the working position by the multiple robots 1 by a conveyor CV.

More specifically, the multiple robots 1 are installed on a predetermined work site. An example range of the predetermined work site is an area within which the multiple robots 1 can simultaneously work on the same workpiece W. Another example range of the predetermined work site is an area within which multiple robots 1 are installed to perform the same or similar work on a workpiece W. Still another example range of the predetermined work site is an area within which a group of robots 1 is installed with spaces of a few or several meters or less between the robots 1. Preferably, the robots 1 are 5 m or less apart from each other. FIG. 1 illustrates a group of robots 1 arranged around a workpiece W. The robots 1 arranged around the workpiece W have the longest inter-robot distance L between the robot 1 denoted by reference character A and the robot 1 denoted by reference character B. More specifically, this distance is preferably 5 m or less.

Each robot 1 includes an arm 10 as a movable portion, and a control unit 20. Each arm 10 includes a plurality of arm members and a plurality of joints. Each arm 10 also includes a plurality of servomotors 11 for driving the individual joints (refer to FIG. 2). The servomotors 11 may be various servomotors such as rotational motors, linear motors, and the like. Each servomotor 11 includes an operating position detector that detects the operating position of the servomotor. For example, the operating position detector is an encoder. The detection value from the operating position detector is transmitted to the control unit 20.

Although the arm 10 is illustrated as a movable portion in the present embodiment, the movable portion may also be a hand attached to the tip of the arm 10 or any processing tool attached to the arm 10.

Figure 2:
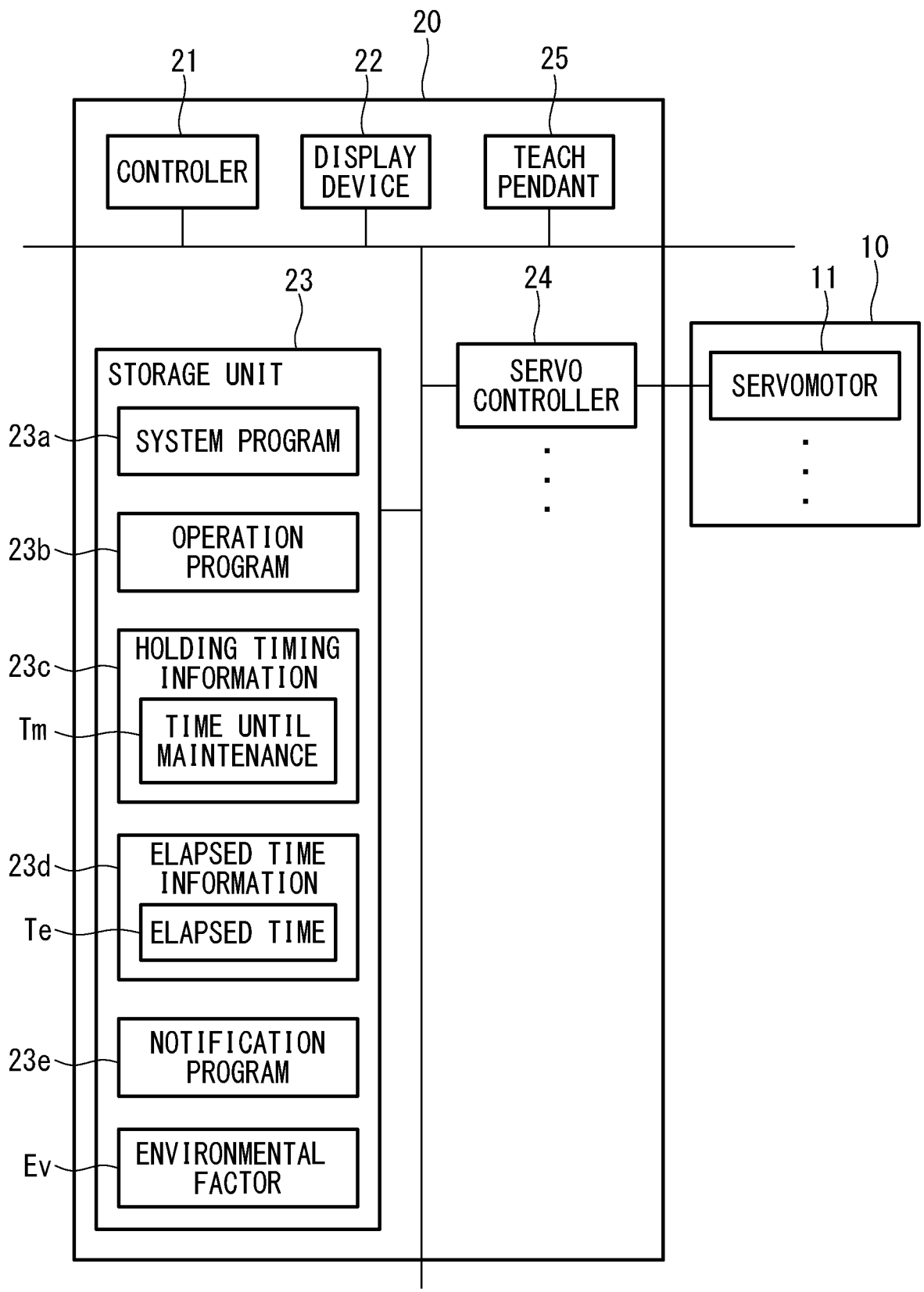
FIG. 2 is a block diagram of a control unit for robots used in the working system according to the embodiment.

As illustrated in FIG. 2, the control unit 20 includes a controller 21 including CPU and RAM, a display device 22, a storage unit 23 including nonvolatile storage and ROM, a plurality of servo controllers 24 corresponding respectively to the servomotors 11 of the arm 10, and an input unit 25 connected to the control unit 20. In an example, the input unit 25 is an input device such as a teach pendant that can be carried by an operator. The input unit 25 may wirelessly communicate with the control unit 20.

The storage unit 23 stores a system program 23a. The system program 23a is responsible for basic functions of the control unit 20. The storage unit 23 also stores at least one operation program 23b.

The controller 21 is operated by the system program 23a. The controller 21 reads out and temporarily stores the operation program 23b in the RAM. On the basis of the operation program 23b, the controller 21 then transmits a control instruction for predetermined work on the workpiece W to the servo controllers 24. As a result, the arm 10 performs the predetermined work on the workpiece W.

The storage unit 23 in each robot 1 stores maintenance timing information 23c regarding the arm 10 and the control unit 20 of the robot 1. The maintenance timing information 23c includes time Tm until lubricant or coolant maintenance and time Tm to component maintenance. Hereinafter, time Tm until maintenance may be simply referred to as reference time Tm. The lubricants include grease and oil. The components include the servomotors 11, a belt, a chain, gears, oil seals, cables, a fan, an electronic component, and a battery. In the present embodiment, lubricant reference time Tm is stored in the storage unit 23 for each portion of the arm 10. In addition, component reference time Tm is stored in the storage unit 23 for each of the various components. The various lubricants, coolants, and components are maintenance targets.

The date for maintenance or the period for maintenance may also be stored in the storage unit 23 in place of the time Tm until maintenance.

The storage unit 23 in each robot 1 stores elapsed time information 23d regarding the time that has elapsed from the previous maintenance for each of the various kinds of maintenance. In an example, the elapsed time information 23d is elapsed time Te. In other examples, the elapsed time Te may be replaced with the time and the amount of operation weighted based on the amount of operation and the state of the robot 1, the number of times the robot 1 has performed predetermined work or the time period of the work, and the number of times the robot 1 has performed predetermined operation or the time period of the operation, which are stored in the storage unit 23 as the elapsed time information 23d. The elapsed time Te is the total operating time of the robot 1 from the previous maintenance, the time that has elapsed from the previous maintenance, or a combination thereof. The elapsed time Te is regularly updated based on the clock of the control unit 20.

Figure 3:
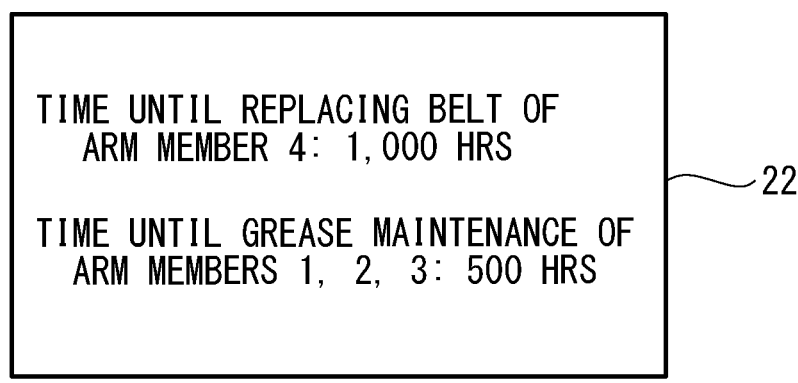
FIG. 3 shows an example of indication appearing on a display device of a robot according to the embodiment.

The storage unit 23 in each robot 1 also stores a notification program 23e. The controller 21 temporarily stores the notification program 23e in the RAM and performs the operation below based on the notification program 23e. The controller 21, as illustrated in FIG. 3, indicates information about maintenance, for example, on the display device 22. In another example, the controller 21 notifies the operator of information about maintenance via a speaker. In still another example, the controller 21 transmits information about maintenance to another machine such as a computer terminal. The indication, the notification, and the transmission of information about maintenance are notification processing.

The controller 21 performs the notification processing based on a comparison between the maintenance timing information 23c and the elapsed time information 23d. For example, notification processing is performed when, regarding a component, the difference between the reference time Tm and the elapsed time Te falls below a predetermined value Th, as represented by expression (1):

$$Tm-Te<Th \qquad (1)$$

The storage unit 23 in each robot 1 also stores an environmental factor Ev. In the present embodiment, the environmental factor Ev is a factor used to correct the maintenance timing information 23c. In another example, the environmental factor Ev is a factor used to correct the elapsed time information 23d. The environmental factor Ev is, for example, 1 at the factory shipment. When the environmental factor Ev has been 1 since the factory shipment, the controller 21 uses expression (1) to determine whether to perform notification processing.

In the present embodiment, the storage unit 23 stores an environmental factor Ev for each of the multiple maintenance targets. In another example, the storage unit 23 stores a single environmental factor Ev that can be used for the multiple maintenance targets. The controller 21 rewrites each of the multiple environmental factors Ev. For example, the controller 21 rewrites each of the environmental factors Ev based on an input to the input unit 25. The controller 21 also rewrites each of the environmental factors Ev using information received from the control unit 20 of a second robot 1. The controller 21 also rewrites each of the environmental factors Ev in accordance with the details of the maintenance that has been performed for the arm 10.

As an example, when the belt of a robot 1 breaks before the elapse of the reference time Tm and the belt of the robot 1 is replaced, the controller 21 rewrites the environmental factor Ev regarding this belt. For example, when the ratio of the actual time until belt replacement to the time of the holding Tm is 0.7, the environmental factor Ev is rewritten as 0.7 from 1.

The controller 21 of the robot 1 that has experienced maintenance transmits the environmental factor Ev regarding the belt to the control unit 20 of a second robot 1 installed on the predetermined work site. The robot 1 that has experienced the maintenance is also installed on the predetermined work site.

The controller 21 in the control unit 20 of the second robot 1 operates as described below based on the notification program 23e.

The controller 21 of the second robot 1 rewrites the environmental factor Ev regarding its belt using the received environmental factor Ev. After rewriting the environmental factor Ev, the controller 21 of the second robot 1 uses expression (2) below to determine whether to perform notification processing. Expression (2) below has the elapsed time Te corrected using the received environmental factor Ev:

$$Tm-(Te1/Ev1+Te2/Ev2)<Th \qquad (2)$$

where Te1 denotes the elapsed time before the rewriting of the environmental factor Ev, and Te2 denotes the elapsed time after the rewriting of the environmental factor Ev. Ev1 denotes an environmental factor before the rewriting, and Ev2 denotes an environmental factor after the rewriting.

In an example of other processing, the controller 21 of the second robot 1, after rewriting the environmental factor Ev, uses expression (3) below to determine whether to perform notification processing. Expression (3) below has the reference time Tm corrected using the received environmental factor Ev:

$$Tm \times Ev - Te < Th \qquad (3)$$

Note that another expression may also be used to correct the maintenance timing information 23c or the elapsed time information 23d.

Expressions (2) and (3) above are intended to correct the maintenance timing information 23c or the elapsed time information 23d using the environmental factors Ev, Ev1, and Ev2. However, instead of sending the environmental factor Ev, the controller 21 of the robot 1 that has experienced maintenance may send a second robot 1 an environmental value used for the calculation of the environmental factor Ev. The environmental value is, for example, an environmental temperature, the temperature of the robot 1, an operating condition, or a combination thereof.

In this case, the controller 21 of the second robot 1, when correcting the maintenance timing information 23c or the elapsed time information 23d, uses the environmental value received in place of the environmental factors Ev, Ev1, and Ev2. In some cases, the second robot 1 may use the received environmental value to rewrite the environmental factor Ev stored in the storage unit 23.

In an example of still other processing, the controller 21 of the robot 1 that has experienced maintenance rewrites the belt reference time Tm. The controller 21 of the robot 1 that has experienced maintenance then transmits the rewritten reference time Tm to a second robot 1. The controller 21 of the second robot 1 then uses the received reference time Tm to rewrite its belt reference time Tm. In other words, the received reference time Tm is used to correct the belt reference time Tm.

If the second robot 1 in this processing is viewed as a target robot 1, the robot 1 that has experienced maintenance is now regarded as a second robot 1. The controller 21 of the target robot 1 uses information received from the second robot 1, such as the environmental factor Ev and the reference time Tm, to correct its environmental factor Ev or reference time Tm.

In an example of still other processing, when a robot 1 is moved to another predetermined work site, the robot 1 receives an environmental factor Ev transmitted from a second robot 1 installed on this predetermined work site. In an example, the control unit 20 of the newly installed robot 1 requests an environmental factor Ev from the control unit 20 of a second robot 1, and the second robot 1 transmits the environmental factor Ev. In another example, the control unit 20 of the newly installed robot 1 receives reference time Tm from a second robot 1.

In an example of still other processing, the maintenance timing information 23c stored in the storage unit 23 of any robot 1 installed on a predetermined work site is rewritten based on an input to the input unit 25. The controller 21 of the robot 1 then transmits rewriting information to a second robot 1 installed on the predetermined work site. The rewriting information is the rewritten maintenance timing information 23c itself, such as an environmental factor Ev. The second robot 1 uses the received information to correct its maintenance timing information 23c or its elapsed time information 23d.

In each example of the above processing, a first robot 1 receives information such as an environmental factor Ev from a second robot 1. In addition to the receipt of the information, the environmental factor Ev or other information stored in the storage unit 23 in the control unit 20 of the first robot 1 may be rewritten by the controller 21 of the second robot 1. The controller 21 in the control unit 20 of the first robot 1 may also permit the controller 21 of the second robot 1 to rewrite the maintenance timing information 23c stored in the storage unit 23. For example, when the control unit 20 of the first robot 1 receives a rewriting request from the second robot 1, the control unit 20 of the first robot 1 sends a permission signal to the second robot 1. As a result, the controller 21 of the second robot 1 rewrites the maintenance timing information 23c in the storage unit 23 of the first robot 1. Also in this case, the first robot 1 uses information received from the second robot 1 to correct the maintenance timing information 23c.

The environmental factor Ev or the reference time Tm is directly transmitted from one robot 1 to another robot 1. The environmental factor Ev or the reference time Tm may also be transmitted from one robot 1 to another robot 1 via a higher rank system 100.

In an example, the higher rank system 100 determines the cause of the need for the maintenance of the robot 1 that has experienced the maintenance, and the higher rank system 100 identifies a second robot 1 that also has the cause. In this case, the environmental factor Ev or the reference time Tm is transmitted to the identified robot 1.

In the present embodiment, the controller 21 of a first robot 1 installed on a predetermined work site uses information received from a second robot 1 installed on the predetermined work site to correct the maintenance timing information 23c or the elapsed time information 23d as described above. The controller 21 of the first robot 1 then uses the corrected maintenance timing information 23c or the corrected elapsed time information 23d to perform predetermined notification processing.

For example, the rate of deterioration of a maintenance target such as lubricating oil or a component varies depending on the environment in which a robot 1 is used. With multiple robots 1 used in the same environment, the maintenance targets of the robots 1 tend to have similar rates of deterioration. In the present embodiment, information used to correct the maintenance timing information 23c or the elapsed time information 23d is exchanged between robots 1, and thus notification processing or the timing thereof is automatically and properly determined.

In the present embodiment, the controller 21 of a robot 1 corrects the maintenance timing information 23c or the elapsed time information 23d using the received environmental factor Ev. The use of the environmental factor Ev facilitates the correction of the maintenance timing information 23c, the correction of the elapsed time information 23d, or appropriate management thereof. Thus, even replacement of a robot 1 installed in a production line will not hinder the correction of the maintenance timing information 23c, the correction of the elapsed time information 23d, or appropriate management thereof.

For example, the controller 21 of a robot 1 can determine the degree and a method of correction, or whether to perform the correction before and after the receipt of the environmental factor Ev from a second robot 1.

In the present embodiment, the controller 21 of the robot 1, as illustrated in FIG. 3, indicates the maintenance details and the maintenance timing on the display device 22. This embodiment enables the operator to easily and reliably recognize the information regarding the maintenance needed for the robot 1.

In the present embodiment, the maintenance timing information 23c stored in the storage unit 23 of any robot 1 installed on a predetermined work site is rewritten based on an input to the input unit 25. The controller 21 of the robot 1 then transmits rewriting information to a second robot 1 installed on the predetermined work site. In this manner, the rewriting information is shared among the multiple robots 1 installed on the predetermined work site. The sharing is advantageous for suitably fixing notification processing or the timing thereof.

The following aspects of the present invention are derived from the above disclosure.

A robot according to a first aspect of the present invention includes a movable portion; a controller; and a storage unit that stores maintenance timing information regarding at least one of the movable portion and the controller, wherein the controller performs predetermined notification processing based on a comparison between elapsed time information and the maintenance timing information, the movable portion and the controller are placed in a predetermined work site on which a second robot is installed, and the controller corrects the maintenance timing information or the elapsed time information using information received from the second robot.

In the first aspect, the controller of a first robot installed on the predetermined work site uses information received from a second robot installed on the predetermined work site to correct the maintenance timing information or the elapsed time information. The controller of the first robot then uses the corrected maintenance timing information or the corrected elapsed time information to perform predetermined notification processing.

For example, the rate of deterioration of a maintenance target such as lubricating oil or a component varies depending on the environment in which a robot is used. With multiple robots used in the same environment, the maintenance targets of the robots tend to have similar rates of deterioration. In the first aspect, information used to correct the maintenance timing information or the elapsed time information is exchanged between robots, and thus details of notification processing or the timing thereof is automatically and properly determined.

In this aspect, preferably, the information received from the second robot is an environmental factor, and the controller corrects the maintenance timing information or the elapsed time information using the received environmental factor.

The use of the environmental factor facilitates the correction of the maintenance timing information, the correction of the elapsed time information, or appropriate management thereof. Thus, even replacement of a robot installed in a production line will not hinder the correction of the maintenance timing information, the correction of the elapsed time information, or appropriate management thereof.

In this aspect, preferably, the predetermined notification processing indicates maintenance details and maintenance timing on a predetermined display device.

This aspect enables the operator to easily and reliably recognize the information regarding the maintenance needed for the robot.

In this aspect, preferably, the controller transmits information related to rewriting to a second robot installed in the predetermined work site when the maintenance timing information is rewritten, and the information related to rewriting is intended to correct maintenance timing information regarding the second robot or correct elapsed time information regarding the second robot.

This aspect allows the rewriting information to be shared among the multiple robots installed on the predetermined work site. The sharing is advantageous for suitably fixing notification processing or the timing thereof.

A second aspect of the present invention is a maintenance timing notification method for a robot installed in a predetermined work site, the robot including a movable portion, a controller, and a storage unit that stores maintenance timing information regarding at least one of the movable portion and the controller, the method comprising: comparison, by the controller, of elapsed time information and the maintenance timing information; performing, by the controller, predetermined notification based on a comparison result from the comparison; and before the comparison, correcting, by the controller, the maintenance timing information or the elapsed time information using information received from a second robot installed in the predetermined work site.

In this aspect, preferably, in the correcting, the controller corrects the maintenance timing information or the elapsed time information using an environmental factor received from the second robot.

In this aspect, preferably, in the notification, the controller indicates maintenance details and maintenance timing on a predetermined display device.

This aspect, preferably, further includes rewriting, with a predetermined input device, the maintenance timing information stored in the storage unit; and transmitting, by the controller, rewriting information to a second robot installed in the predetermined work site, wherein the rewriting information is intended to correct maintenance timing information regarding the second robot or correct elapsed time information regarding the second robot.

The above aspects can efficiently achieve maintenance timing management for performing maintenance of multiple robots with more appropriate timing.

REFERENCE SIGNS LIST 1 robot
10 arm (movable portion)
11 servomotor
20 control unit
21 controller
22 display device
23 storage unit
23a system program
23b operation program
23c maintenance timing information
23d elapsed time information
23e notification program
Tm time until maintenance
Te elapsed time
Ev environmental factor

The invention claimed is:

1. A robot comprising:
a movable portion;
a controller; and
a storage unit that stores maintenance timing information regarding at least one of the movable portion and the controller, the storage unit storing a correction factor for correcting at least one of elapsed time information and the maintenance timing information,
wherein the controller performs predetermined notification processing based on the elapsed time information and the maintenance timing information, and
the controller performs a step of correcting the correction factor from a previously-stored value of the correction factor based on information including an environmental value received from a second robot, said environmental value comprising an update to a stored environmental value of the robot, and corrects the at least one of the elapsed time information and the maintenance timing information based on the step of correcting the correction factor.

2. The robot according to claim 1, wherein the predetermined notification processing indicates maintenance details and maintenance timing on a predetermined display device.

3. The robot according to claim 1, wherein the controller transmits information related to rewriting to the second robot or one or more other robots installed in the predetermined work site when the maintenance timing information is rewritten, and the information related to rewriting is used to correct maintenance timing information regarding the second robot or the one or more other robots, or correct elapsed time information regarding the second robot or the one or more other robots.

4. A robot according to claim 1, wherein the controller corrects a first part of the elapsed time information or the maintenance timing information by using a corrected correction factor corrected in the step, wherein the first part corresponds to a part of the elapsed time information or the maintenance timing information after receiving the environmental value, and the controller does not correct a second part of the elapsed time information or the maintenance timing information by using the corrected correction factor, wherein the second part corresponds to a part of the elapsed time information or the maintenance timing information before receiving the environmental value.

5. A maintenance timing notification method for a robot installed in a predetermined work site, the robot including a movable portion, a controller, and a storage unit that stores maintenance timing information regarding at least one of the movable portion and the controller, the method comprising:

storing, in the storage unit, a correction factor for correcting at least one of elapsed time information and the maintenance timing information;

comparing, by the controller, the elapsed time information and the maintenance timing information;

performing, by the controller, a predetermined notification based on a comparison result from the comparison; and prior to comparing, performing a first step of correcting, by the controller, the correction factor from a previously-stored value of the correction factor based on information including an environmental factor received from the second robot said environmental factor comprising an update to a stored environmental factor of the robot, and a second step of correcting at least one of the elapsed time information and the maintenance timing information based on the first step of correcting the correction factor, said second step of correcting the at least one of the elapsed time information and the maintenance timing information performed after the first step of correcting the correction factor.

6. The maintenance timing notification method for a robot according to claim 5, wherein in the notification, the controller indicates maintenance details and maintenance timing on a predetermined display device.

7. The maintenance timing notification method for a robot according to claim 5, further comprising:

rewriting, with a predetermined input device, the maintenance timing information stored in the storage unit; and transmitting, by the controller, rewriting information to the second robot or one or more other robots installed in the predetermined work site, wherein the rewriting information is intended to correct maintenance timing information regarding the second robot or the one or more other robots, or correct elapsed time information regarding the second robot or the one or more other robots.

8. A maintenance timing notification method for a robot according to claim 5, wherein the controller corrects, when correcting the at least one of the elapsed time information and the maintenance timing information, a first part of the elapsed time information or the maintenance timing information by using a corrected correction factor corrected in the first step of correcting the correction factor, wherein the first part corresponds to a part t of the elapsed time information or the maintenance timing information after receiving the environmental value, and the controller does not correct a second part of the elapsed time information or the maintenance timing information by using the corrected correction factor, wherein the second part corresponds to a part of the elapsed time information or the maintenance timing information before receiving the environmental value.

* * * * *